United States Patent
Zook et al.

[11] Patent Number: 5,683,578
[45] Date of Patent: Nov. 4, 1997

[54] FILTER VALVE SYSTEM FOR REGULATING, FILTERING, AND DISPENSING A FLOW OF HOT MELT MATERIALS AND ADHESIVES

[75] Inventors: Jon C. Zook, Hendersonville; Larry Warden, Gallatin, both of Tenn.

[73] Assignee: Illinois Tool Works Inc., Glenview, Ill.

[21] Appl. No.: 539,847

[22] Filed: Oct. 6, 1995

Related U.S. Application Data

[63] Continuation-in-part of Ser. No. 441,385, May 15, 1995.
[51] Int. Cl.$^6$ ............................................. B01D 35/027
[52] U.S. Cl. ..................... 210/175; 210/234; 210/418; 222/146.2; 425/197; 126/343.5 R; 126/507
[58] Field of Search ............................ 210/234, 240, 210/405, 418, 420, 421, 424, 430, 431, 175; 126/343.5 R, 507; 110/179; 137/334; 222/146.2; 425/197

[56] References Cited

U.S. PATENT DOCUMENTS

| | | | |
|---|---|---|---|
| 4,615,812 | 10/1986 | Darling | 210/234 |
| 4,787,986 | 11/1988 | Dietl et al. | 210/175 |
| 4,832,077 | 5/1989 | Pilolla | 210/234 |
| 5,242,581 | 9/1993 | Mohr | 210/234 |

*Primary Examiner*—W. L. Walker
*Attorney, Agent, or Firm*—Dvorak & Orum

[57] ABSTRACT

An apparatus for controlling and filtering the flow or viscous fluid in a material melting and dispensing device is disclosed. The apparatus includes a rotatable valve assembly having a filter plate and a flow stoppage plate. Rotation of the valve alternately allows or halts the flow of viscous fluid. The convenient ability to block the flow of viscous fluid such as hot melt adhesive at a point immediately downstream of a hopper or material melt space facilitates repair, maintenance, or removal of other downstream elements such as a pump without the need for draining the hopper, while avoiding excessive spillage of hot melt adhesive.

11 Claims, 4 Drawing Sheets

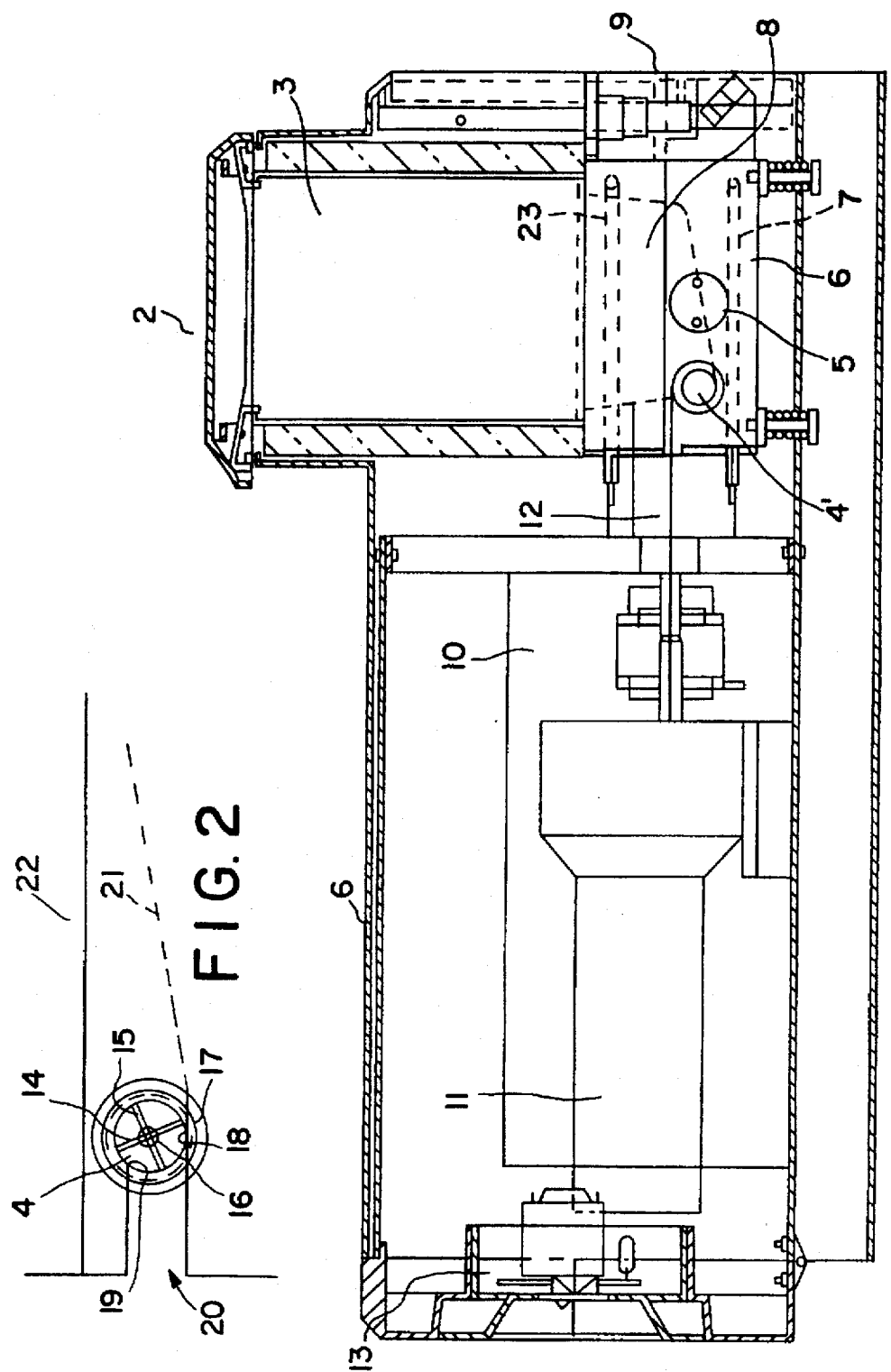

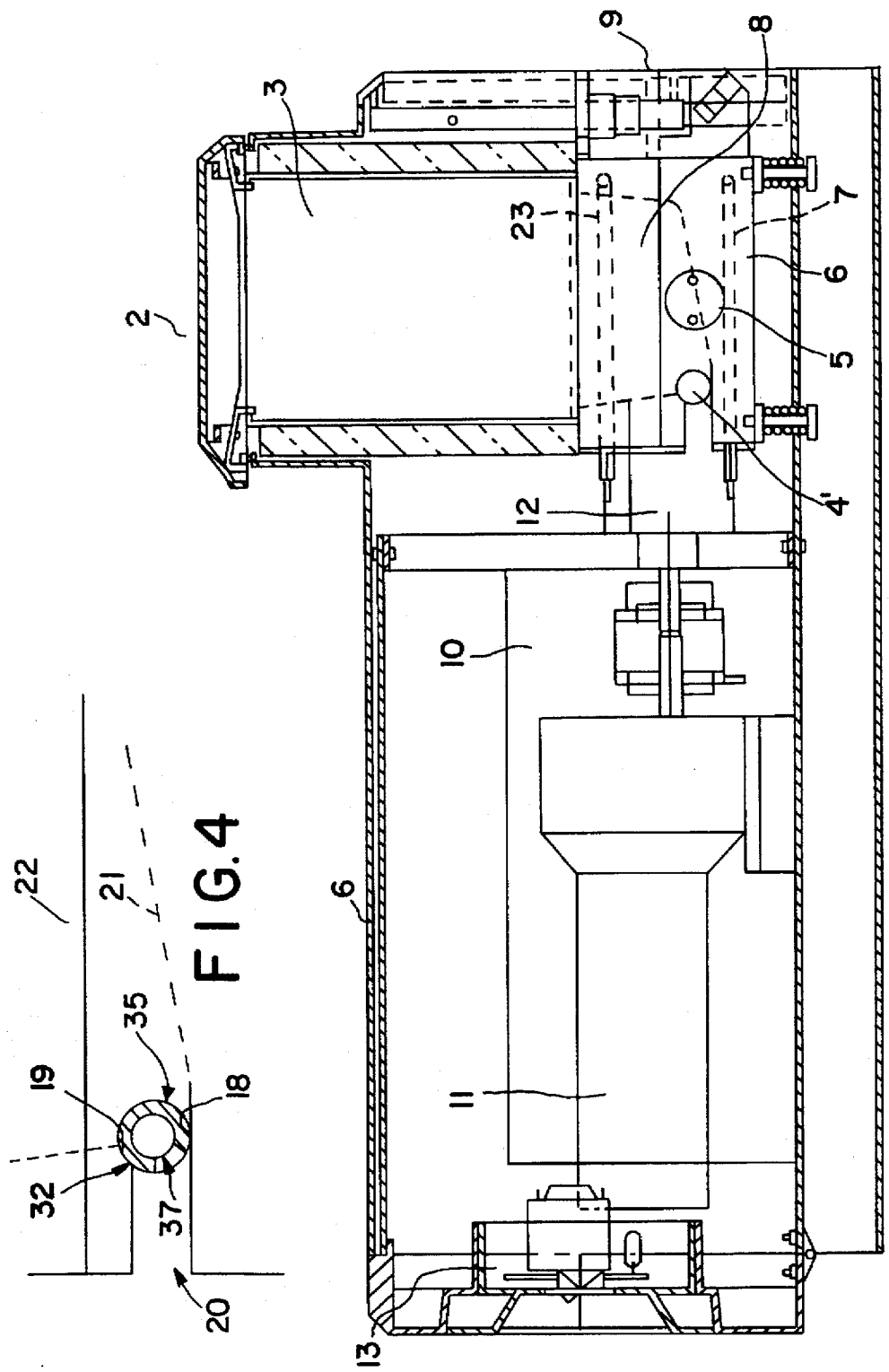

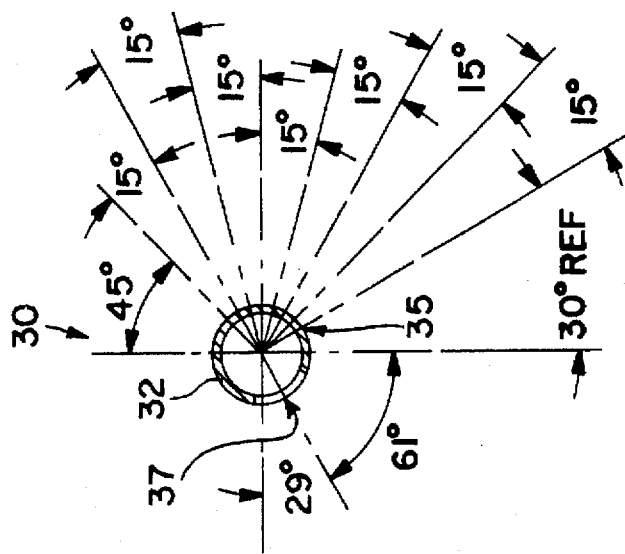
FIG. 3C
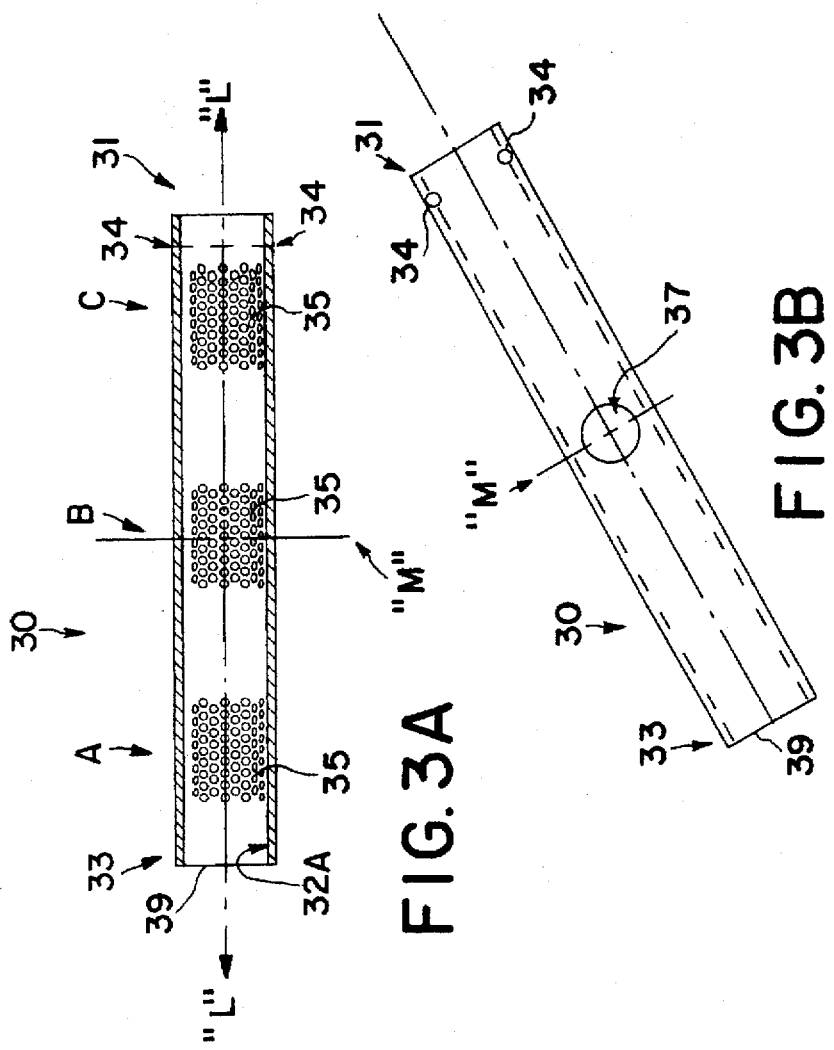
FIG. 3A
FIG. 3B

FILTER VALVE SYSTEM FOR REGULATING, FILTERING, AND DISPENSING A FLOW OF HOT MELT MATERIALS AND ADHESIVES

CROSS REFERENCE TO RELATED APPLICATIONS

This application is a continuation-in-part of application Ser. No. 08/441,385, filed on May 15, 1995, and is related to four applications entitled:

"Multiple Heat Source Grid Assembly";

"Removable Hopper Cover";

"Heat Dissipating Chimney for Adhesive Supply Unit"; and

"Adhesive Supply Unit"

BACKGROUND OF THE INVENTION

1. Field of the Invention

This invention relates to an apparatus for receiving thermoplastic and other hot melt materials and adhesives, melting the material, and supplying the melted material to a dispenser. A shut-off valve/filter arrangement is provided for filtering the melted material, and for stopping the flow of material in a manner which allows for disassembly of the apparatus without spillage of melted material.

2. Description of the Related Art

In the past, hot melt material and adhesive supply units lacked modularity in the design of the hopper/heater/pump/supply elements of an entire unit. Removal and repair of a failed element of the unit would involve a cumbersome shut-down and disassembly procedure. Melted material would in the past spill on the unit upon partial disassembly of the unit, necessitating time-consuming clean-up. Also, in the past, it would generally be necessary to drain the tank or hopper before replacing or servicing an element of the unit. These drawbacks were particularly problematic as they related to removal, replacement, or servicing of the pump element of the unit.

It is therefore an object of the present invention to provide a tank filter/shut-off valve assembly which addresses and solves the problems associated with removal, replacement, or servicing of individual elements of a hot melt material/adhesive supply unit. Specifically, the present invention provides a means for isolating the hopper and melted material from the rest of the unit, to facilitate removal, replacement, or servicing of individual elements of the unit such as the pump. The filter/shut-off valve of the present invention provides course filtering for normal operation, and provides a positive shut-off and isolation of melted material, preventing spillage during servicing of the unit.

BRIEF DESCRIPTION OF THE DRAWINGS

FIG. 1 is a side view of a first embodiment of the present invention illustrating the entire melting/dispensing apparatus.

FIG. 1A is a side view of a second embodiment inserted within the melting/dispensing apparatus of FIG. 1.

FIG. 2 is a cross-sectional view of a first embodiment of the shut-off valve and filter.

FIG. 3A is a top cross-sectional view of the shut-off valve gate and filter.

FIG. 3B is a bottom view of the shut-off valve gate and filter.

FIG. 3C is a cross-sectional end view of the shut-off valve gate and filter.

FIG. 4 is an end view in partial cross-section of the shut-off valve gate and filter inserted within the melt space.

DESCRIPTION OF THE PREFERRED EMBODIMENTS

Figure 2A:
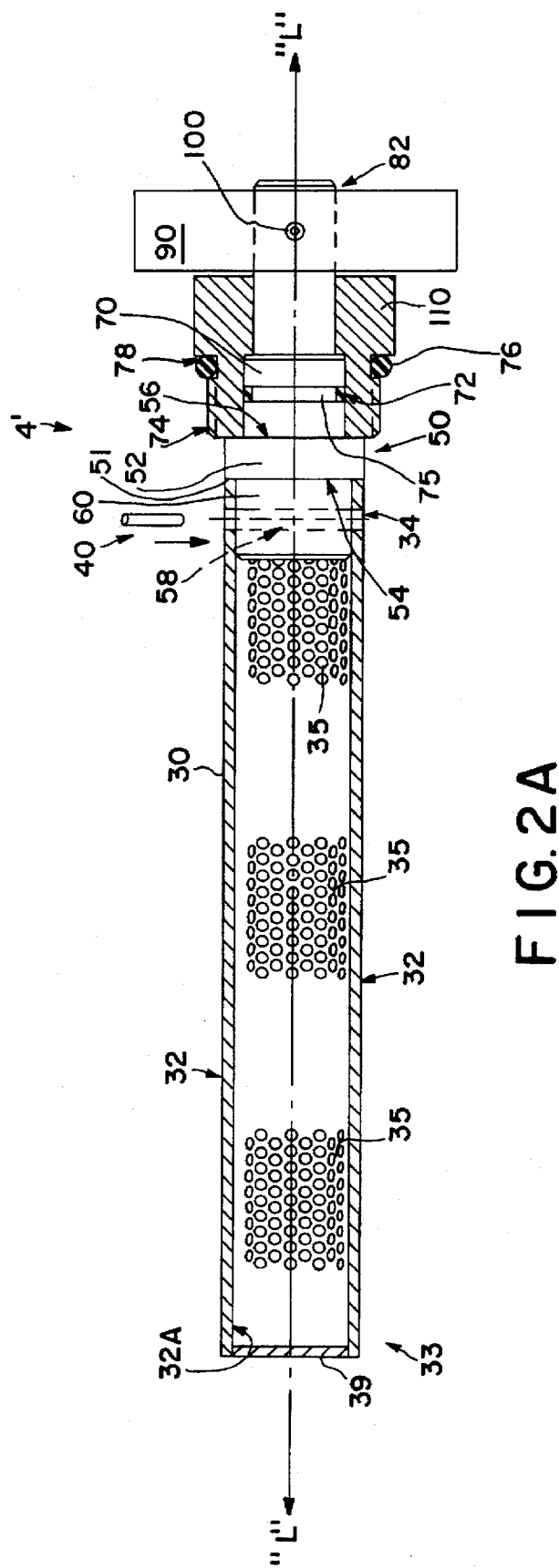
FIG. 2A is a cross-sectional view of a second embodiment of the shut-off valve and filter.

Referring to the drawings, FIG. 1 shows a material melting and dispensing apparatus 1 having a hopper 3 and hopper cover 2. Solid and quasi-solid material to be melted, such as hot melt adhesive pellets, are added to the hopper 3. Heat is supplied to the melter body 6 through the upper and lower heating elements 23 and 7. The melted material is drawn through the shut-off valve and filter 4 and is subsequently pumped by pumping means 12, the pumping means 12 being driven by the prime mover 11 through the coupling 10. Feedback is provided by the temperature sensing means 5, and control of the process is maintained by the control panel 13. The material is dispensed as needed through the shut-off valve/filter 4 and eventually through the dispensing means 9.

Referring now specifically to the shut-off valve/filter arrangement, FIG. 2 shows the shut-off valve/filter 4, which may be generally cylindrical in shape. The circumferential screen 17 of the shut-off valve/filter 4 may be constructed of a relatively course mesh material, and may be generally formed in the shape of a cylinder. This circumferential screen 17 serves as a course filter, preventing the movement of solid or quasi-solid particulate matter to downstream locations such as the pump means 12. The shut-off valve/filter 4 may be located generally at a low point along the material melt space bottom surface 21, and may be positioned proximate the pump inlet passage 20. The circumferential screen 17 may seat against an upper seating surface 19 and a lower seating surface 18 in a manner which would isolate the material melt space 22 from the pump inlet passage 20.

Within the circumferential screen 17 are disposed the shut-off means which may be in the form of a non-perforated inlet sheet 15, and an additional filter means which may be in the form of a perforated inlet filter sheet 14. The non-perforated inlet sheet 15 and the perforated inlet sheet 14 may be rectangular in shape, or may be various other shapes. The non-perforated inlet sheet 15 and the perforated filter inlet sheet 14 may be arranged at substantially right angles to each other, and may be fastened to each other by sheet connecting means 16. Actuation of the shut-off valve/filter 4 may be achieved by applying a torque to sheet connecting means 16 by an external tool, or handle. The valve assembly comprising the non-perforated inlet sheet 15, the perforated filter inlet sheet 14, and the sheet connecting means 16, in one embodiment, are rotatable together. In operation, rotation of the sheet connecting means 16 to a position at which the terminal longitudinal edges of the non-perforated inlet sheet 15 are mated with the upper seating surface 19 and the lower seating surface 18 results in blockage of hot melt material flow from the material melt space 22 to the pump inlet passage 20. When the shut-off valve/filter is in this position, repair or replacement operations may be performed on downstream components of the material melting and dispensing apparatus without the need for draining the hopper 3, and without the problems associated with leakage of hot melt material. Upon further rotation of the sheet connecting means 16 to a position where the terminal longitudinal edges of the non-perforated inlet sheet 15 are no longer mated with the upper and lower seating surfaces 19 and 18 respectively, hot melt material is again allowed to flow from the material melt space 12 to the pump inlet passage 20, eventually to be dispensed. At a position where the terminal longitudinal edges of the perforated filter inlet sheet 14 are mated against the upper and lower seating surfaces 19 and 18 respectively, the perforated filter inlet sheet 14 serves as a coarse filter, arresting the movement of particles of solid or quasi-solid hot melt materials further downstream. In one embodiment, rotation limiters or stops are provided to ensure that the same side of the perforated filter inlet sheet 14 is always presented to the material melt space, to prevent over-rotation and the subsequent introduction of trapped particulate material to downstream locations. Rotation may in one version of this embodiment be limited to approximately 90°.

A second embodiment of the present invention will now be described, and where applicable, the same reference numerals will be used to describe like elements. Turning attention now to FIG. 2A, the second embodiment of the shut-off valve/filter arrangement 4' is shown. This assembly is comprised of a generally cylindrical filter tube/valve gate 30 connected by means 40 to a filter tube/valve gate receiving stem 50. Connecting means 40 is preferably a roll pin, although any suitable type of connector can be utilized. Stem 50 is comprised of a body portion 52 having a base 60 integrally formed on the bottom side 54 of body 52, and a shaft pillar 70 integrally formed on the top side 56. Pillar 70 also includes an integrally formed shaft 80 projecting therefrom, with handle 90 attached to one shaft end 82 by a means 100. Shaft pillar 70 and shaft 80 are rotatably received within a mounting collar 110 which is itself received by a wall of the hot melt hopper 3 (not shown). Actuation of the shut-off valve/filter assembly 4' is achieved by applying a torque to handle 90. When a torque is applied in either a clockwise or counterclockwise direction, it can be appreciated that stem 50 and filter tube 30 are correspondingly rotated in a like direction.

It can further be appreciated that mounting collar 110 remains stationary relative to the rotation of shaft 80 and shaft pillar 70, wherein a pillar O-ring 72 maintains a seal between pillar 70 and the internal surface of the collar 110 when rotated. As seen, O-ring 72 is received with annular groove 75 cut into pillar 70. Preferably, a Viton® rubber seal is provided so that the hot melted adhesives will not chemically deteriorate the O-ring and allow melted material to transgress along shaft 80 when step 50 is rotated. Similarly, a second O-ring seal 76 of like material is provided on the outside surface 74 of collar 70, and held in place within an undercut annular slot 78. It should be understood that O-ring 76 will be compressed against a wall or side of the hot melt hopper (not shown) when valve/filter assembly 4' is inserted within the melt space 21. This second O-ring provides a seal against hot melted adhesives escaping at the connection between assembly 4' and hopper 3.

FIGS. 3A through 3C show in greater detail that filter tube/valve gate 30 is generally cylindrical in shape and may be constructed of seamless metallic tubing, pipe, ceramic, or even a composite material; in this case, seamless aluminum tubing is used. As mentioned earlier, filter tube/valve gate 30 is connected to receiving stem 50 by roll pin 40, where throughbores 34 and aperture 58 are in alignment with each other so that pin 40 is slidably received therein. Pin 40 provides filter tube/valve gate assembly 4' the capability to quickly change the filter tube/valve gate component 30 if need be, for whatever reason may arise. As best seen from viewing FIG. 2A, the one end 31 of filter tube/valve gate 30 rests against the shoulder 51 of receiving stem 50, where in base 60 of the stem is slidingly received therein such that outer surface 62 is in tight, abutting contact against the inside surface 32A of the filter tube/valve gate 30.

FIGS. 3A through 3C also show that filter tube/valve gate 30 contains a plurality of holes 35 formed on the circumference, and at three distinct longitudinal locations A, B, C, along a longitudinal axis "L" of assembly 4'. All holes 35 are formed of an equal diameter, preferably about 1/16 to 5/64 inches. Each location contains a like number of holes in order to provide uniform flow of hot material. It has been found that this diameter is sufficient for allowing hot, melted adhesives therethrough, while the holes simultaneously serve as a course filter for preventing the movement of solid or quasi-solid particulate matter to downstream locations such as the pump means 12. Like the previous embodiment, the assembly 4' is again typically located at the low point along the material melt space bottom surface 21, and proximate to pump inlet passage 20. This is best seen from viewing FIGS. 1A and 4, where it is seen that filter tube/valve gate 30 is seated against upper seating surface 19 and lower seating surface 18 in a manner which would isolate the material melt space 22 from pump inlet passage 20.

When viewing FIG. 4 along with FIGS. 3B and 3C, the operation of assembly 4', and for that matter, filter tube/valve gate 30, will now be described in greater detail. As mentioned, holes 35 are found along distinct locations A, B, and C, in order to provide a uniform drawing and filtering of the hot material along the entire bottom surface 21 of melt space 23. Action of filter tube/valve gate 30 is rotatably operational through turning of handle 90, wherein in a first and sealing position, upper and lower seating surfaces 18 and 19 simultaneously mate with a non-perforated portion of tube/valve gate outer surface 32, to block the flow of hot melt material from space 22 to pump inlet passage 20. When in this position, repair or replacement operations may be performed on any of the downstream components without the previously discussed problems. Upper further rotation of outer surface 32 to a second and flowing position, holes 35 receive the hot melt material, while outlet 37 communicates said material into pump inlet passage 20, and then it is eventually dispensed. In the second operating position, holes 35 simultaneously serve as a filtering means, arresting the downstream movement of solid or quasi-solid particles further downstream. It should also be understood from the FIG. 2A that terminal end 33 would include a sealing means 39, which forces hot melt material from the terminal end 33, towards the central area "M" (see FIG. 3B), where outlet 37 is located and that when in this position, outlet 37 is positioned such that it spans between upper and lower contact surfaces 18 and 19.

More specifically, FIG. 3C illustrates the construction of filter tube/valve gate 30 necessary for providing sealing and flowing capabilities as a result of the discrete location of holes 35 and 37 relative to outer surface 32 mating with upper and lower contact surfaces 18 and 19. As the figure illustrates, rows of holes are located every 15° apart, with preferably seven rows of holes being drilled in exacting locations at each of the longitudinal regions A, B, and C. Hole 37 is located slightly offset from a diametrical position from the circumferential span of hole 35, in order to ensure positive sealing against contact surfaces 18 and 19, when filter tube/valve gate 30 is positioned to allow material flow therethrough. Furthermore, handle 90 can be appropriately marked so that correct rotational direction, and total degrees of rotation of member 30 is ensured, in order to facilitate finding the correct sealing or closed positions.

Two embodiments of the invention have been described above. However, those skilled in the art will appreciate the various modifications which could be made to the present invention without departing from the scope of the invention. The invention is therefore not limited except by the scope of the appended claims.

We claim:

1. An apparatus for regulating and filtering the flow of hot melt materials and adhesives in a material melting and dispensing apparatus, comprising:

a circumferential filter screen;

a non-perforated inlet sheet and a perforated inlet filter sheet disposed within the circumferential filter screen;

a sheet connecting means for fastening the non-perforated inlet sheet and the perforated inlet sheet filter together at substantially right angles to one another to form a valve assembly, the valve assembly being rotatable upon application of torque to the sheet connecting means, and being positionable in a first position to block the flow of viscous fluids, and being positionable in a second position to permit the flow of viscous fluids, a hopper having a material melt space and a pump inlet passage, a lower seating surface disposed on a bottom surface of the material melt space, an upper seating surface disposed on a portion of the hopper adjacent the pump inlet, wherein the perforated inlet sheet filter and the non-perforated inlet sheet of the valve assembly are each positionable to alternately locate terminal longitudinal edges of each sheet simultaneously in sealing engagement against the upper and lower seating surfaces, wherein rotation of the valve assembly to a first position blocks the flow of viscous fluid from a material melt space to a pump inlet, and rotation of the valve assembly to a second position permits the flow of viscous fluid from a material melt space to a pump inlet passage.

2. An apparatus according to claim 1, wherein rotation of the valve assembly to position terminal longitudinal edges of the perforated inlet sheet filter in sealing engagement with the upper and lower seating surfaces presents perforations in the inlet sheet filter to the flow of viscous fluid allowing for filtered flow of viscous fluid from the material melt space to the pump inlet passage, and rotation of the valve assembly to position terminal longitudinal edges of the non-perforated inlet sheet in sealing engagement with the upper and lower seating surfaces presents the non-perforated surface of the non-perforated inlet sheet to the flow of viscous fluid, blocking the flow of viscous fluid from the material melt space to the pump inlet passage.

3. An apparatus according to claim 2, further comprising rotation limitation means, the rotation limitation means arranged and constructed to limit rotation of the valve assembly to substantially 90°.

4. An apparatus according to claim 2, further comprising valve assembly indicator means, the valve assembly indicator means having a visual indication of the position of the valve assembly.

5. An apparatus according to claim 2, wherein the non-perforated inlet sheet and the perforated inlet sheet are substantially rectangular.

6. In combination, an apparatus for regulating and filtering a flow of hot melt materials and adhesives in a material melting and dispensing apparatus, and a filter valve assembly, said melting apparatus having a bottom surface disposed on a bottom of a material melt space, said bottom surface being open between an upper contact surface and a lower contact surface, said contact surface defining a pump inlet passageway, said apparatus disposed along a longitudinal axis, said filter valve assembly comprised of a generally circumferential filter tube/valve assembly disposed along said bottom surface of said melt space, wherein said valve assembly is rotatable between a first position and a second position, said first position corresponding to a sealing position where hot melt material is retained within said material melt space and said second position corresponding to a flowing position where said hot melt material is allowed to flow from said melt space to a pump inlet passage.

7. The apparatus according to claim 6, wherein said assembly is comprised of a filter tube/valve gate connected to a receiving stem which is rotatable within a collar through operation of a handle, said handle attached to said stem, said filter tube/valve gate arranged about said longitudinal axis.

8. The apparatus according to claim 7, wherein said filter tube/valve gate has an outer surface defining a circumference of said filter tube/valve gate, said outer surface perforated with a plurality of hot melt inlet holes disposed along said longitudinal axis at three distinct areas, said filter tube/valve gate, including a hot melt outlet hole disposed in an diametrically offset position from said inlet holes.

9. The apparatus of claim 8 wherein said inlet holes and said outlet hole simultaneously are arranged between said upper and lower contact surfaces when in said first position.

10. The apparatus of claim 9 wherein said inlet and outlet holes define a continuously solid section of said outer surface, said solid section simultaneously contacting said upper and lower contact surfaces when in said position to block a flow of hot melt material into said pump inlet passage.

11. The apparatus of claim 6 wherein at least two sealing means on said collar prevent hot melt material from leaking out of said hot melt space in a longitudinal direction, along said assembly.

* * * * *